US012584810B2

(12) United States Patent
Hsu

(10) Patent No.: US 12,584,810 B2
(45) Date of Patent: Mar. 24, 2026

(54) PRESSURE GAUGE

(71) Applicant: WELTER'S CO., LTD., Dou Liu City (TW)

(72) Inventor: Walter W. Hsu, Dou Liu City (TW)

(73) Assignee: WELTER'S CO., LTD., Dou Liu City (TW)

(*) Notice: Subject to any disclaimer, the term of this patent is extended or adjusted under 35 U.S.C. 154(b) by 279 days.

(21) Appl. No.: 18/397,056

(22) Filed: Dec. 27, 2023

(65) Prior Publication Data

US 2025/0216278 A1     Jul. 3, 2025

(51) Int. Cl.
*G01L 7/04* (2006.01)
*G01L 1/02* (2006.01)

(52) U.S. Cl.
CPC .............. *G01L 7/041* (2013.01); *G01L 1/02* (2013.01); *G01L 7/043* (2013.01)

(58) Field of Classification Search
CPC ......... G01L 7/041; G01L 19/16; G01L 7/166; G01L 7/084; G01L 7/043; G01L 1/02
See application file for complete search history.

(56) References Cited

U.S. PATENT DOCUMENTS 10,571,352 B2 * 2/2020 Huang ................ G01L 19/0618

FOREIGN PATENT DOCUMENTS

CN          207622922 U   *   7/2018
TW          M558348 U     *   4/2018

OTHER PUBLICATIONS

CN207622922U (Year: 2018).*
TWM558348U (Year: 2018).*

* cited by examiner

*Primary Examiner* — Thomas M Hammond, III
(74) *Attorney, Agent, or Firm* — LANWAY IPR SERVICES; Chun-Ming Shih

(57)          ABSTRACT

A pressure gauge includes a first fastener, a second fastener, a rotation member, and a positioning module. The first fastener includes a guide portion having a first spiral section and a second spiral section. The second fastener is mounted on the bottom of the first fastener. The rotation member has a shaft provided with a protruding rib and a pointer. The positioning module includes a positioning block having an air hole, and a elastic member having a first end mounted on the air hole and a second end abutting the rotation member. The air hole introduces an air pressure into the elastic member that is expanded and pushes the shaft upward so that the protruding rib and the pointer are rotated and moved upward along the first spiral section and the second spiral section, to precisely indicate visible air pressure values.

9 Claims, 7 Drawing Sheets

PRESSURE GAUGE

BACKGROUND OF THE INVENTION

Field of the Invention

The present invention relates to a measuring device and, more particularly, to a pressure gauge for detecting an air pressure in an object.

Description of the Related Art

A conventional mechanically designed pressure gauge was disclosed in the Taiwan Patent No. M368063. In such a pressure gauge, the combination of the mounting part and the supporting part of the pressure gauge is too complicated and requires multiple machining procedures. In addition, the assembly method of the pressure gauge is irreversible so that of the pressure gauge cannot be disassembled after assembly, thereby causing inconvenience in maintenance. In detail, the supporting part of the pressure gauge is made of metal. After the mounting part is installed below the supporting part, the supporting part needs to be punched through a stamping machine so that its lower edge forms an inward folded frame edge, so that the mounting part, the gaskets, and the diaphragms are fixed within the inward folded frame edge. However, the parts of the pressure gauge are assembled by aid of the stamping machine, thereby increasing the cost of fabrication. In addition, the pressure gauge cannot be dismantled for repair and maintenance, so that after the supporting part is deformed during the working process of the stamping machine, it is difficult for the supporting part to return to the original state. If disassembly is required, it is necessary to cut or break the inward folded frame edge of the supporting part so that the inward folded frame edge cannot be used to hold the mounting part, the gaskets, and the diaphragms. Further, the conventional pressure gauge has a complicated structure with too many parts so that it needs much manual labor for assembly. For example, the pointer shaft includes many components, such as a support shaft, a crossbar, a pointer, a rotating part or the like. Thus, assembly of the conventional pressure gauge greatly increases the cost of assembly, production, and fabrication.

BRIEF SUMMARY OF THE INVENTION

In accordance with the present invention, there is provided a pressure gauge comprising a first fastener, a second fastener, a rotation member, and a positioning module. The first fastener includes a first recess, a second recess, a central guide hole, and a guide portion. The central guide hole connects the first recess and the second recess. The guide portion is provided on an upper end of the central guide hole. The guide portion has a first spiral section and a second spiral section that are reversely opposite to each other. The first spiral section and the second spiral section construct a guide groove. The second fastener is mounted on a bottom of the first fastener. The second fastener has a first end portion and a second end portion. The second end portion is connected to the first end portion. The rotation member has a shaft. The shaft has a top end provided with a protruding rib and a pointer extending outward. The protruding rib and the pointer are opposite to each other horizontally and axially. The positioning module includes a positioning block and a elastic member. The positioning block has a center provided with an air hole penetrating the positioning block.

The elastic member has a first end mounted on the air hole and a second end abutting a bottom of the rotation member. The first fastener is arranged above and connected with the second fastener. The positioning module is inserted into a bottom of the second fastener. The shaft extends through the central guide hole. The protruding rib and the pointer horizontally rest on the first spiral section and the second spiral section. The air hole is connected to an external air pressure source which introduces an air pressure into the elastic member so that the elastic member is expanded. At the same time, the elastic member pushes the shaft upward so that the protruding rib and the pointer are rotated and moved upward along the guide groove defined by the first spiral section and the second spiral section, to precisely indicate visible air pressure values.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
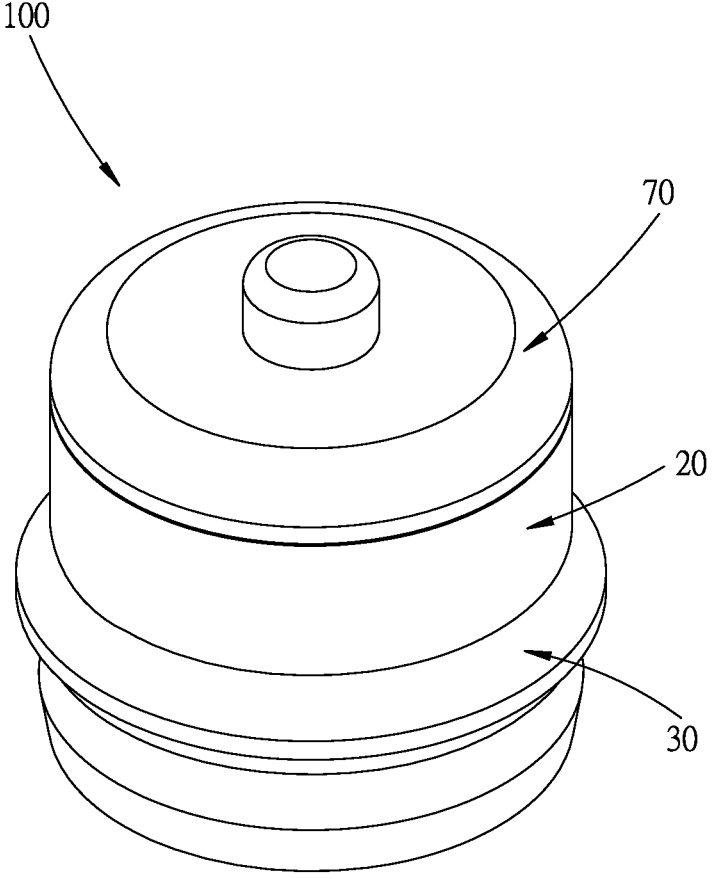
FIG. 1 is a perspective view of a pressure gauge in accordance with the preferred embodiment of the present invention.
Figure 2:
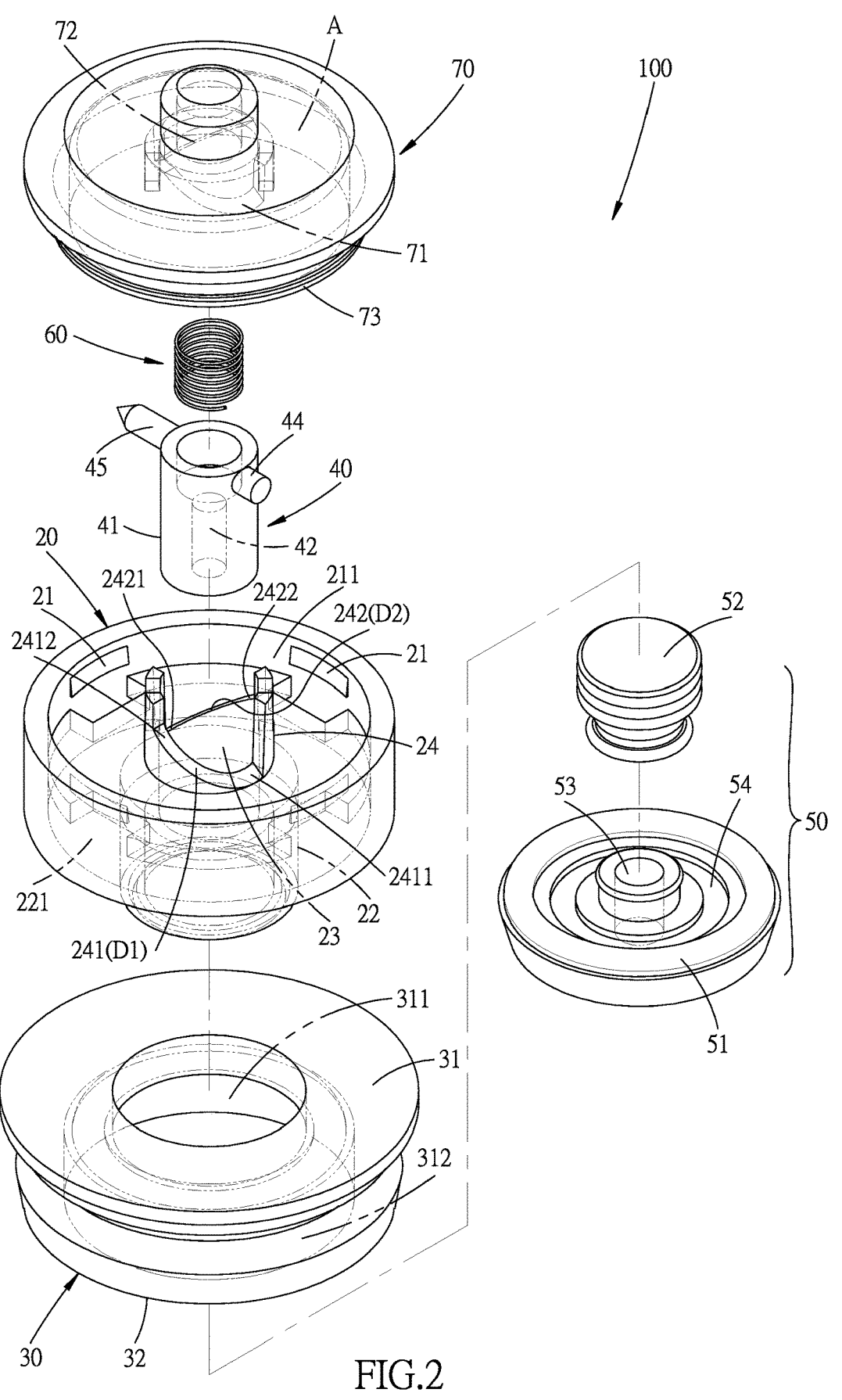
FIG. 2 is an exploded perspective view of the pressure gauge in accordance with the preferred embodiment of the present invention.
Figure 3:
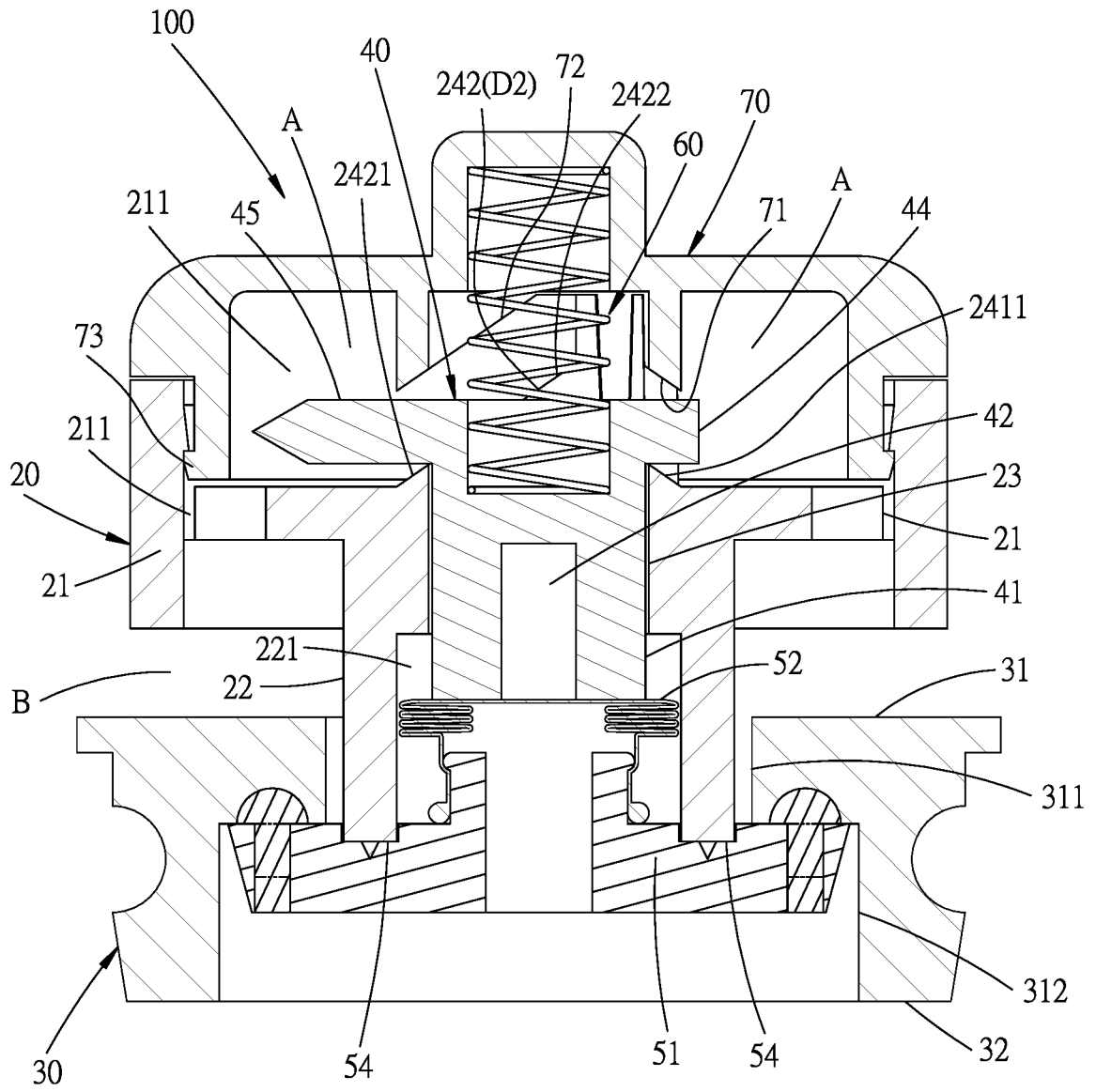
FIG. 3 is a cross-sectional view of the pressure gauge as shown in FIG. 1.
Figure 4:
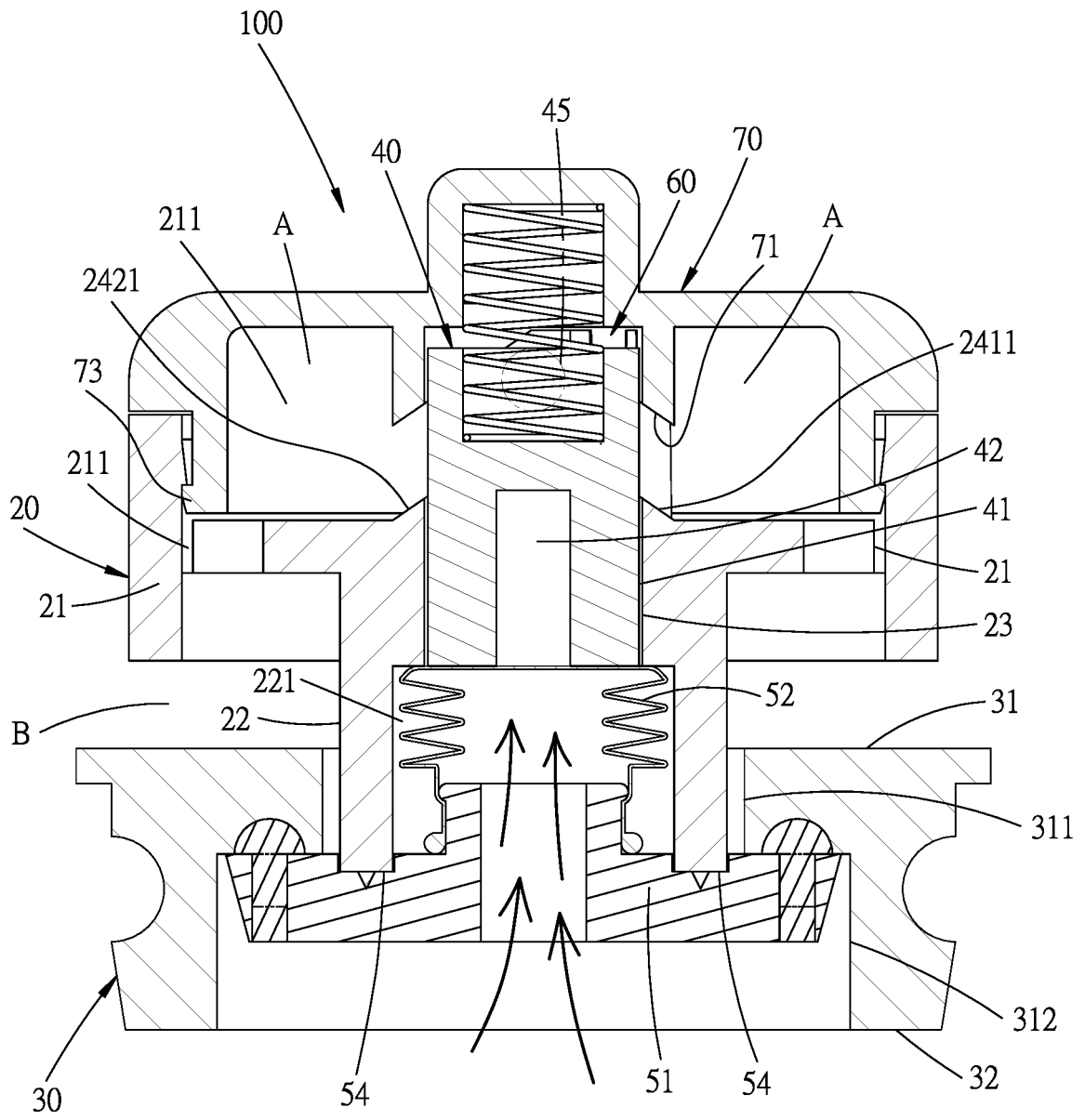
FIG. 4 is a schematic operational view of the pressure gauge as shown in FIG. 3 in inflation.
Figure 5:
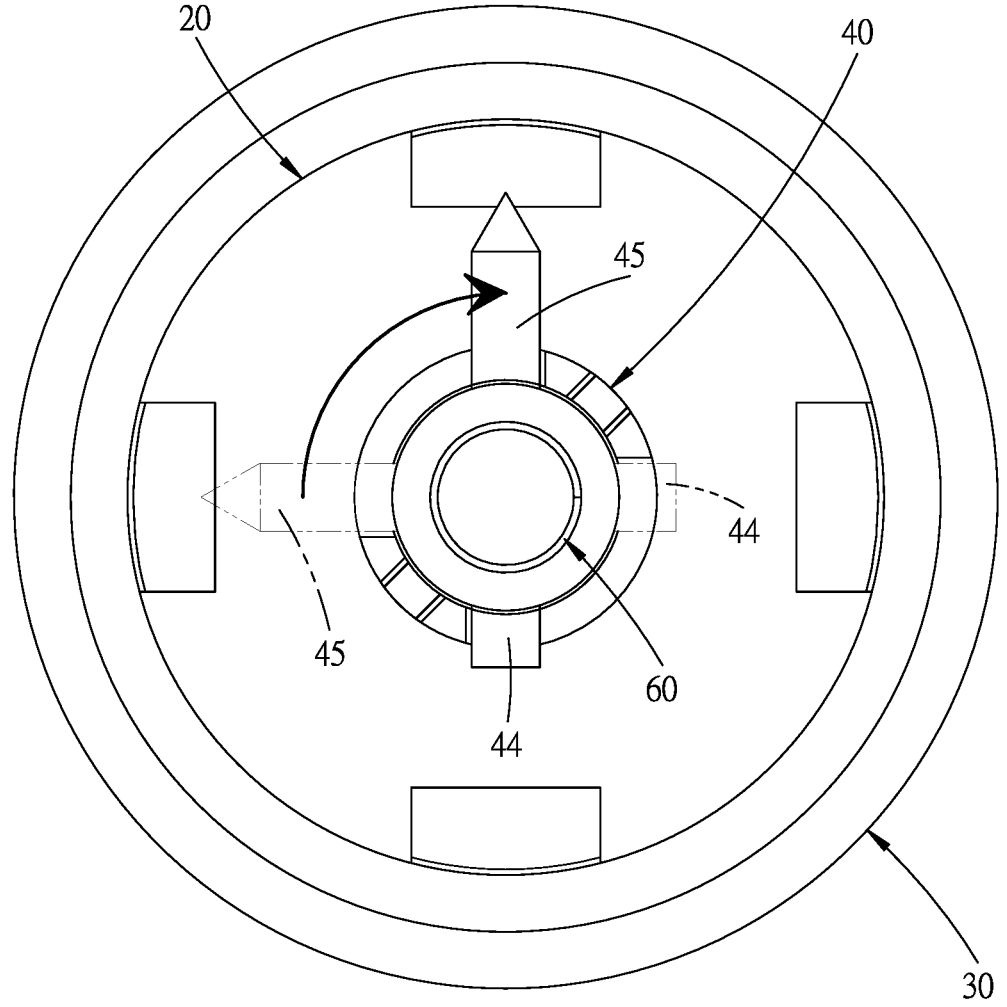
FIG. 5 is a schematic view showing detecting operation of the pointer of the pressure gauge during the inflation state.
Figure 6:
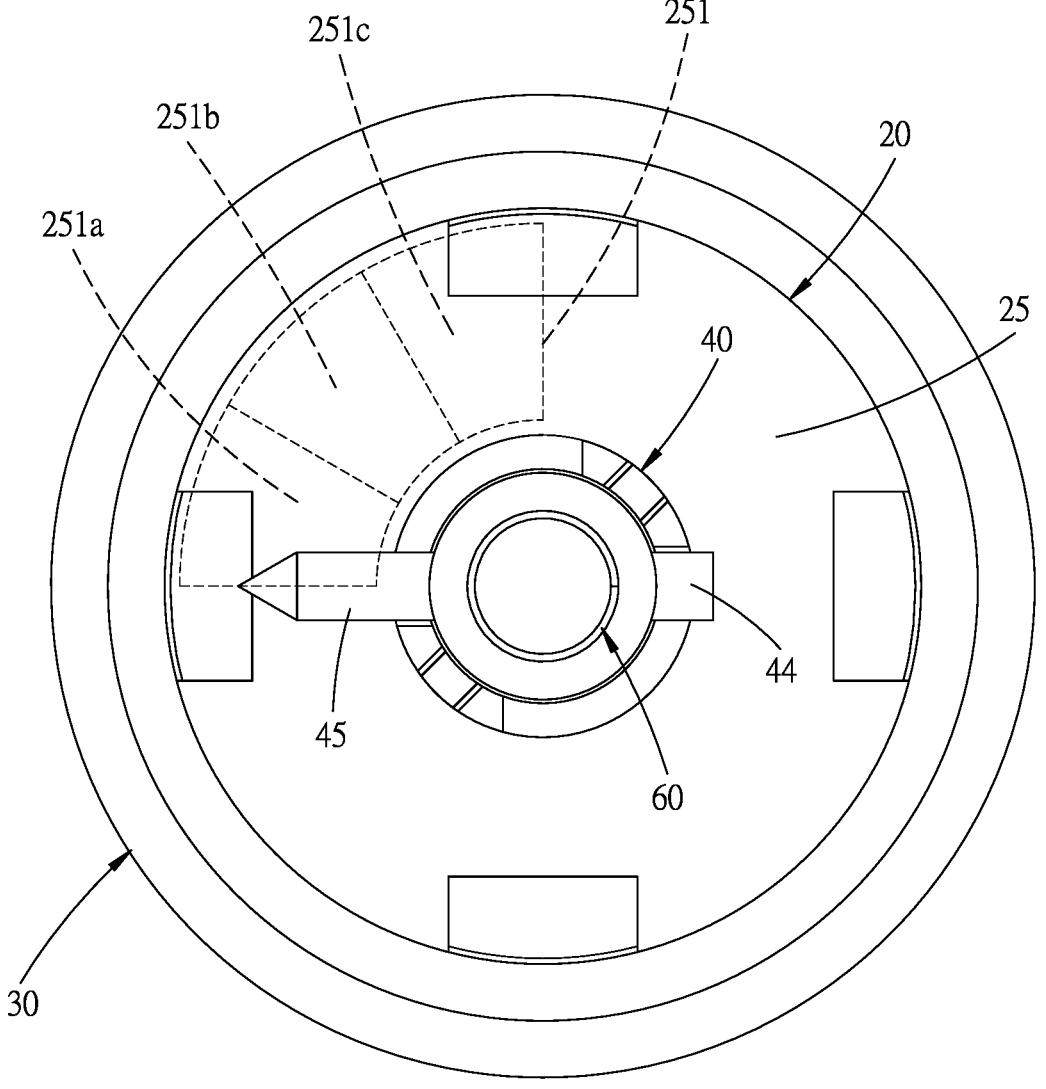
FIG. 6 is another schematic view showing detecting operation of the pointer of the pressure gauge during the inflation state.

Referring to the drawings and initially to FIGS. 1-6, a pressure gauge 100 in accordance with the preferred embodiment of the present invention comprises a first fastener (or snap-fit member) 20, a second fastener (or snap-fit member) 30, a rotation member 40, and a positioning module 50.

The first fastener 20 includes a first recess 211, a second recess 221, a central guide hole 23, and a guide portion 24. The central guide hole 23 is arranged at a center of the first recess 211. The central guide hole 23 connects the first recess 211 and the second recess 221. The guide portion 24 is provided on an upper end of the central guide hole 23 and protrudes upward. The guide portion 24 has a first spiral (or threaded) section D1 and a second spiral (or threaded) section D2 that are reversely opposite to each other. The first spiral section D1 and the second spiral section D2 construct a guide groove (or spiral groove).

The second fastener 30 is mounted on a bottom of the first fastener 20. The second fastener 30 is a mounting ring. The second fastener 30 has a first end portion 31 and a second end portion 32. The second end portion 32 is connected to the first end portion 31.

The rotation member 40 has a shaft 41. The shaft 41 is hollow and is rotatable in the central guide hole 23. The shaft 41 has a top end provided with a protruding rib 44 and a pointer 45 extending outward. The protruding rib 44 and the pointer 45 are opposite to each other horizontally and axially and are rotated with the shaft 41 simultaneously.

The positioning module 50 is mounted on the bottom of the second end portion 32. The positioning module 50 includes a positioning block 51 and an elastic member 52. The positioning block 51 has a center provided with an air hole 53 penetrating the positioning block 51. The elastic member 52 has a first end (or bottom) having an opening mounted on the air hole 53 and a second end (or top) abutting a bottom of the rotation member 40.

In assembly, the first fastener 20 is arranged above and connected with the second fastener 30. The positioning module 50 is inserted into a bottom of the second fastener 30. The shaft 41 extends through the central guide hole 23. The protruding rib 44 and the pointer 45 horizontally rest on the first spiral section D1 and the second spiral section D2. The air hole 53 is connected to an external air pressure source (not shown) which introduces an air pressure into the elastic member 52 so that the elastic member 52 is expanded. At the same time, the elastic member 52 pushes the shaft 41 upward so that the protruding rib 44 and the pointer 45 are rotated and moved upward along the guide groove defined by the first spiral section D1 and the second spiral section D2, to precisely indicate visible air pressure values.

In the preferred embodiment of the present invention, the first fastener 20 is provided with multiple snap-fit (or fastening) portions 21 arranged in an inside of the first recess 211. The snap-fit portions 21 are spaced from each other.

In the preferred embodiment of the present invention, the first fastener 20 is provided with a connecting portion 22 arranged in a center of the second recess 221. The connecting portion 22 protrudes outward from the second recess 221. The second recess 221 has an opening directed downward.

In the preferred embodiment of the present invention, the first end portion 31 is provided with a mounting portion 311, and the second end portion 32 is provided with a fitting portion 312 connected to the mounting portion 311. The mounting portion 311 is hollow and formed in the top face of the first end portion 31. The fitting portion 312 is hollow and formed in the bottom face of the second end portion 32. The fitting portion 312 has a diameter more than that of the mounting portion 311. The first end portion 31 faces the second recess 221.

In the preferred embodiment of the present invention, the connecting portion 22 is inserted into and assembled with the mounting portion 311. The positioning block 51 is mounted in and rests on the fitting portion 312.

In the preferred embodiment of the present invention, a plug (not shown) is mounted between the fitting portion 312 and the positioning block 51. The plug has a center provided with a connecting hole connected to the first end portion 31 and the second end portion 32 and connected to the external air pressure source.

In the preferred embodiment of the present invention, the positioning block 51 is an inverted T-shaped gasket. The air hole 53 is connected to the first end portion 31 and the second end portion 32. A plug (not shown) is mounted on the bottom of the first end portion 31. The plug has a center provided with a connecting hole. The elastic member 52 is made of elastic material and is expanded elastically when subjected to the air pressure.

In the preferred embodiment of the present invention, a cover 70 is mounted on the first fastener 20. The cover 70 is a PVC faceplate made of transparent material. The cover 70 has a center having an inside provided with a first slot 71 and a second slot 72 aligning with the first spiral section D1 and the second spiral section D2 respectively. The first slot 71 and the second slot 72 match the first spiral section D1 and the second spiral section D2 respectively and construct a movement space (or track) allowing rotation of the protruding rib 44 and the pointer 45.

In the preferred embodiment of the present invention, the shaft 41 has a center provided with a through hole 42. The pointer 45 has a length more than that of the protruding rib 44. The protruding rib 44 and the pointer 45 are rotated in the spiral groove formed by the first spiral section D1 and the second spiral section D2, and are limited in the movement track formed by the first slot 71 and the second slot 72. The shaft 41 is rotated in the central guide hole 23. Thus, when the shaft 41 is pushed by the air pressure, the pointer 45 is rotated in the spiral groove.

In the preferred embodiment of the present invention, a panel 25 (see FIG. 6) is mounted on a top face of the first recess 211. The panel 25 indicates pressure values.

In practice, the panel 25 is provided with a scale 251 indicating the pressure values. The scale 251 includes a first area 251*a*, a second area 251*b*, and a third area 251*c* with different colors or figures. The first area 251*a* indicates a low pressure of 0-30 degrees. The second area 251*b* indicates a middle pressure of 30-60 degrees. The third area 251*c* indicates a low pressure of 60-90 degrees. Thus, the panel 25 cooperates with the pointer 45 to form a visible pressure gauge.

In the preferred embodiment of the present invention, a clamping space B is defined between the first fastener 20 and the first end portion 31. The first fastener 20 is movably snapped onto the second fastener 30. The positioning block 51 is provided with an embedded groove 54 allowing insertion of the connecting portion 22.

In the preferred embodiment of the present invention, the guide portion 24 has a first arcuate face 241 and a second arcuate face 242 located opposite to each other. The first arcuate face 241 has a first end forming a first angle (or low level) 2411 and a second end forming a second angle (or high level) 2412. The first arcuate face 241 gradually extends upward from the first angle (or low level) 2411 toward the second angle (or high level) 2412 and forms the first spiral section D1. The second arcuate face 242 has a first end forming a first angle (or low level) 2421 and a second end forming a second angle (or high level) 2422. The second arcuate face 242 gradually extends upward from the first angle (or low level) 2421 toward the second angle (or high level) 2422 and forms the second spiral section D2.

In the preferred embodiment of the present invention, when the protruding rib 44 and the pointer 45 align with the first angle (or low level) 2411 of the first arcuate face 241 and the first angle (or low level) 2421 of the second arcuate face 242, the protruding rib 44 and the pointer 45 are located at a preset original (or deflated) position, and when the protruding rib 44 and the pointer 45 align with the second angle (or high level) 2412 of the first arcuate face 241 and the second angle (or high level) 2422 of the second arcuate face 242, the protruding rib 44 and the pointer 45 are located at a moved (or inflated) position.

In practice, when the air hole 53 introduces the air pressure into the elastic member 52, the elastic member 52 is expanded to push the shaft 41 so that the protruding rib 44 and the pointer 45 are simultaneously rotated and moved upward along the spiral groove defined by the first spiral section D1 of the first arcuate face 241 and the second spiral section D2 of the second arcuate face 242, to precisely indicate visible air pressure values. Thus, the protruding rib 44 slides on the first spiral section D1 and is moved upward from the first angle (or low level) 2411 of the first arcuate face 241 to the second angle (or high level) 2412, and the pointer 45 slides on the second spiral section D2 and is moved upward from the first angle (or low level) 2421 of the second arcuate face 242 to the second angle (or high level) 2422 of the second arcuate face 242.

In the preferred embodiment of the present invention, the first slot 71 and the second slot 72 are mounted on the guide portion 24. The first slot 71 and the second slot 72 allow insertion of the first arcuate face 241 and the second arcuate face 242 to form the movement track allowing rotation of the protruding rib 44 and the pointer 45. The cover 70 has a periphery provided with multiple locking portions 73 locked in the snap-fit portions 21. A receiving space A is defined between the cover 70 and the first fastener 20 to allow swinging movement of the protruding rib 44 and the pointer 45.

In the preferred embodiment of the present invention, a spring 60 is mounted in the cover 70 and biased between the cover 70 and the rotation member 40. The spring 60 is arranged above the first slot 71 and the second slot 72. When the rotation member 40 is pushed upward, the spring 60 is compressed to store a restoring force that returns the rotation member 40 to the original position after the external force applied on the rotation member 40 disappears.

Figure 7:
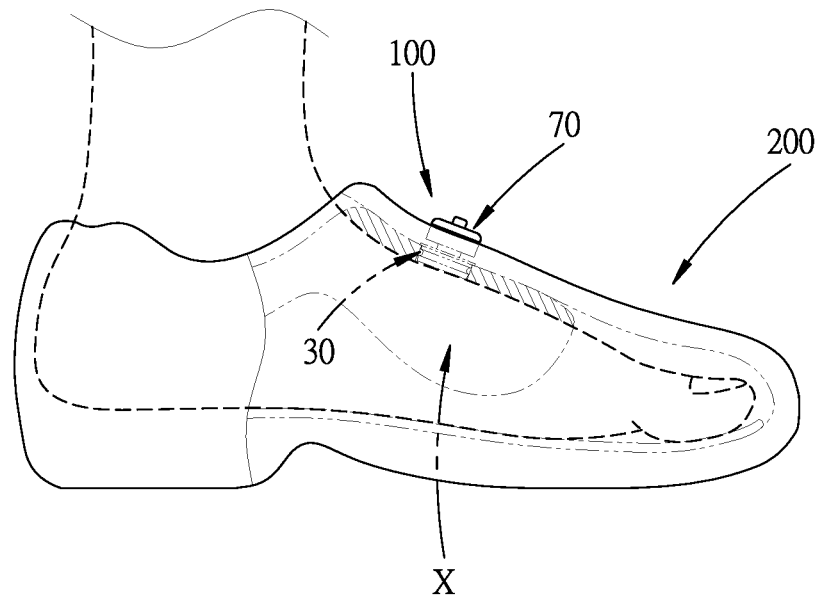
FIG. 7 is a schematic view showing the pressure gauge is installed on a detected object or one of a pair of shoes.

In operation, referring to FIG. 7 with reference to FIGS. 1-6, the pressure gauge 100 is mounted on a mounting hole of a detected object 200, such as one of a pair of sports shoes, an inflatable cushion or the like. The inside of the detected object 200 has an air bag X. The first fastener 20 is movably snapped onto the second fastener 30 so that the pressure gauge 100 is mounted on a surface of the detected object 200 easily, with the detected object 200 being clamped by the clamping space B. The air bag X is connected to the air hole 53. When the air bag X is inflated by the external air pressure source, the air hole 53 introduces the air pressure into the elastic member 52, and the elastic member 52 is expanded to push the shaft 41 so that the protruding rib 44 and the pointer 45 are rotated simultaneously. At this time, the protruding rib 44 slides on the first spiral section D1 and is moved upward from the first angle (or low level) 2411 of the first arcuate face 241 to the second angle (or high level) 2412, and the pointer 45 slides on the second spiral section D2 and is moved upward from the first angle (or low level) 2421 of the second arcuate face 242 to the second angle (or high level) 2422 of the second arcuate face 242. In such a manner, the protruding rib 44 and the pointer 45 are simultaneously rotated and moved upward along the spiral groove defined by the first spiral section D1 of the first arcuate face 241 and the second spiral section D2 of the second arcuate face 242. Thus, the pointer 45 is rotated corresponding to variation of the air pressure, to indicate the air pressure values in the air bag X. Preferably, the scale 251 of the panel 25 is used to indicate the pressure values precisely. After the air pressure indicated by the pointer 45 reaches a preset value, the external air pressure source stops operating to finish the inflation process When the air pressure indicated by the pressure gauge 100 is decreased, the air bag X is inflated immediately so that the air bag X is disposed at the optimum state.

Accordingly, the first fastener 20 is connected with the second fastener 30 easily so that the pressure gauge 100 is installed on the detected object 200 quickly. In addition, when the shaft 41 is rotated, the protruding rib 44 slides on the first spiral section D1, and the pointer 45 slides on the second spiral section D2, so that the pointer 45 is guided by the spiral groove to indicate the air pressure value exactly. Further, the pressure gauge 100 has a simplified structure, is assembled and disassembled conveniently, is repaired easily, and is not damaged easily due to assembly and disassembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A pressure gauge comprising:
   a first fastener, a second fastener, a rotation member, and a positioning module;
   the first fastener includes a first recess, a second recess, a central guide hole, and a guide portion;
   the central guide hole connects the first recess and the second recess;
   the guide portion is provided on an upper end of the central guide hole;
   the guide portion has a first spiral section and a second spiral section that are reversely opposite to each other;
   the first spiral section and the second spiral section construct a guide groove;
   the second fastener is mounted on a bottom of the first fastener;
   the second fastener has a first end portion and a second end portion;
   the second end portion is connected to the first end portion;
   the rotation member has a shaft;
   the shaft has a top end provided with a protruding rib and a pointer extending outward;
   the protruding rib and the pointer are opposite to each other horizontally and axially;
   the positioning module includes a positioning block and a elastic member;
   the positioning block has a center provided with an air hole penetrating the positioning block;
   the elastic member has a first end mounted on the air hole and a second end abutting a bottom of the rotation member;
   the first fastener is arranged above and connected with the second fastener;
   the positioning module is inserted into a bottom of the second fastener;
   the shaft extends through the central guide hole;
   the protruding rib and the pointer horizontally rest on the first spiral section and the second spiral section;
   the air hole is connected to an external air pressure source which introduces an air pressure into the elastic member so that the elastic member is expanded; and
   at the same time, the elastic member pushes the shaft upward so that the protruding rib and the pointer are rotated and moved upward along the guide groove defined by the first spiral section and the second spiral section, to precisely indicate visible air pressure values.

2. The pressure gauge as claimed in claim 1, wherein the first fastener is provided with multiple snap-fit portions arranged in an inside of the first recess, and the snap-fit portions are spaced from each other.

3. The pressure gauge as claimed in claim 1, wherein the first fastener is provided with a connecting portion arranged in a center of the second recess, and the connecting portion protrudes outward from the second recess.

4. The pressure gauge as claimed in claim 1, wherein:

the first end portion is provided with a mounting portion;

the second end portion is provided with a fitting portion connected to the mounting portion; and the mounting portion is hollow.

5. The pressure gauge as claimed in claim 1, wherein the connecting portion is assembled with the mounting portion.

6. The pressure gauge as claimed in claim 1, wherein the positioning block is an inverted T-shaped gasket.

7. The pressure gauge as claimed in claim 1, wherein:

a cover is mounted on the first fastener;

the cover is a PVC faceplate made of transparent material;

the cover is provided with a first slot and a second slot aligning with the first spiral section and the second spiral section respectively; and the first slot and the second slot match the first spiral section and the second spiral section respectively and construct a movement space allowing rotation of the protruding rib and the pointer.

8. The pressure gauge as claimed in claim 1, wherein a panel is mounted on a top face of the first recess and indicates pressure values.

9. The pressure gauge as claimed in claim 1, wherein a clamping space is defined between the first fastener and the first end portion.

* * * * *